UNITED STATES PATENT OFFICE.

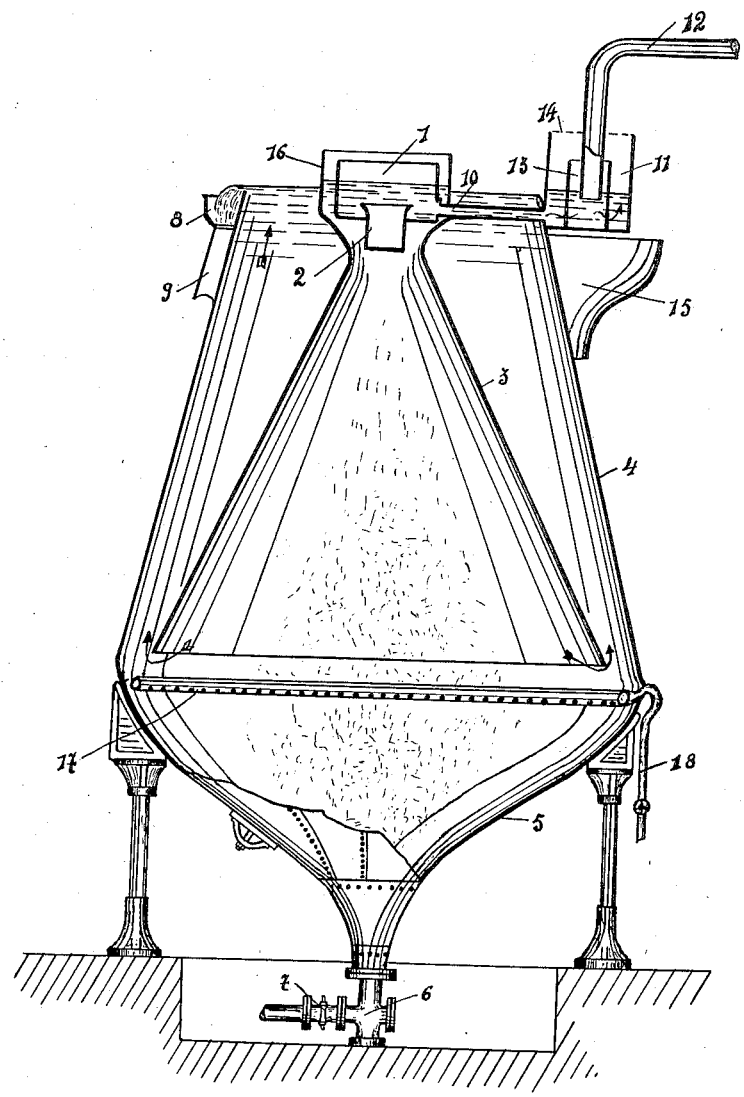

JOSEPH DENOËL, OF LEMBERG, BELGIUM.

DECANTATION APPARATUS.

1,427,446.        Specification of Letters Patent.    Patented Aug. 29, 1922.

Application filed July 7, 1920. Serial No. 394,534.

*To all whom it may concern:*

Be it known that I, JOSEPH DENOËL, manufacturer, a citizen of the Kingdom of Belgium, and resident of Lemberg, Belgium, have invented certain new and useful Improvements in or Relating to Decantation Apparatus (for which I have filed applications in Belgium, on Jan. 28, 1919; Belgium, on Sept. 2, 1919; France, on Oct. 8, 1919; Germany, on Oct. 18, 1919; Great Britain, on Oct. 14, 1919; Italy, on Oct. 16, 1919; Netherlands, on Oct. 20, 1919); and I do hereby declare the following to be a full, clear, and exact description of the invention, such as will enable others, skilled in the art to which it appertains, to make and use the same, reference being had to the accompanying drawings, and to letters or figures of reference marked therein, which form a part of this specification.

This invention relates to decantation apparatus, the chief object being to provide apparatus particularly suitable for the purification of waste liquids from industrial concerns and especially for the recovery of substances contained in the waste water from cellulose factories, paper pulp and paper mills etc.

Decanting apparatus of this kind and especially the apparatus used in paper mills and still called "pulp collectors" effect a concentration of the liquid to be used over again by separating the clear water in excess. This concentration is effected under the action of gravity; that is to say, by settling in a more or less slow current of water.

In the known apparatus the separation is effected either in an ascending current of water or in the horizontal part of a passage traversed by the water. In the first case the upward movement of the water obviously acts prejudicially on the separation under the action of gravity since it acts in the opposite direction thereto. In the second case the necessities of construction compel the horizontal active part of the passage to be made very short so as not to produce a bulky apparatus, and in consequence there is not time for the separation to take place properly.

The decantation apparatus in accordance with the present invention avoids the above mentioned disadvantages by utilizing for the separation a downward flow of the liquid. In this way the movement of the liquid itself favours the settling of the heavy substances to the bottom instead of acting in opposition thereto. Furthermore according to the present invention the separation takes place in an inverted funnel into which the liquid to be treated enters by the narrow opening at the upper part and from which the clear water escapes by way of the periphery of the large opening at the bottom, while the concentrated liquid continues its movement towards the bottom to be evacuated towards the centre of the apparatus. It should be noted as a matter of fact that in consequence of the progressive enlargement of the area offered to the water during its descent, the water which acts as a vehicle for the heavy substances tends constantly to spread out laterally and be directed towards the walls of the funnel, while gravity and inertia on the contrary compel the heavy substances to continue their downward movement in a vertical direction. The result is that in proportion to the descent, the water in contact with the wall is rendered more and more clear while the turbid water separates in a column in the centre of the apparatus.

The present invention likewise relates to certain accessory arrangements concerning in particular the supply of the liquid to be decanted and for the evacuation of the turbid water. These arrangements will appear in the following detailed description of the form of the apparatus illustrated by way of example in the accompanying drawing, the single figure of which represents a vertical section of said form.

The liquid to be purified is led into the tank 1 whence it passes by the neck 2 into the narrowest part of a funnel 3 open at its lower part and arranged within and coaxially of a reservoir 4 with conical walls. The bottom or basin 5 of this reservoir is constructed in the form of a bell; that is to say, the inclination of the wall continues to increase towards the bottom and towards the centre where there is a discharge pipe 6 with a regulating cock 7.

The supply of liquid entering by the neck 2 is regulated in such a way that the velocity at the lower part of the funnel 3 may have as low value as possible which is favourable to the separation. In proportion as the liquid descends the water is compelled to spread out towards the walls of the funnel 3, while its velocity of descent diminishes. The heavy particles are on the contrary drawn downwards to the bottom by the action of gravity and inertia so that at the lower part of the funnel 3 the clear water is situated against the wall and the turbid water at the center.

The clear water can therefore escape laterally and ascend again in the space comprised between the cones 3 and 4 in order to run over at the upper part of the latter into the gutter 8 and the pipe 9. The turbid water continues on the contrary in its descent with a velocity which goes on increasing in consequence of the contraction of the basin 5 and is discharged by the pipe 6.

The passage between the cones 3 and 4 is constructed in such a way that the clear water retains its minimum velocity (for example 1 millimetre per second) during its passage upwards in order to still permit of the deposit of very fine particles which would or might have taken place.

Contrary to the known constructions of apparatus of this kind, the principal part of the apparatus is in the present case the internal inverted funnel which constitutes of itself the decanting device, the other parts of the apparatus being only accessories, the lower part collecting the deposits and discharging them and the upper one conducting the clarified water away to the outside and keeping the hydrostatic pressure up in the interior of the inverted cone.

The bottom 5 is of the bell shape represented firstly for the purpose of diminishing the volume of the apparatus and secondly in order that the heavy substances which have more and more tendency to deposit in proportion as they reach the centre may not be able to adhere to the wall in consequence of the increasing inclination thereof. It should be noted however that this bell form is difficult and costly to construct and may therefore have substituted for it under certain circumstances and for reasons of economy the form of a simple cone.

A manhole made in the wall permits of access to the interior of the apparatus for the purpose of cleaning it out. The wall of the funnel 3, being only in contact with the clarified water, has little tendency to become fouled.

In order to facilitate the rinsing of the wall 5 at each change in the process of manufacture there is provided a sprinkler ring 17 formed of a pipe pierced with holes pointing downwards and receiving fresh water from a pipe 18 provided with a cock.

It should be noted that the conical zone of almost absolute rest in which the separation takes place is situated at a certain depth and at the point of the maximum surface of decantation and therefore out of the way of eddies and countercurrents at the surface.

Furthermore the volume of the apparatus is very reduced and all parts of the apparatus are utilized effectively for the settling because this commences immediately on the entry of the water to be purified into the inverted funnel at its upper part and proceeds in the same direction over the whole height of the apparatus down to its lower part. The result is a maximum settling effect not only by the simple action of gravity but also by the effect of the carrying down of the fine particles by the hail of heavy substances coming from above and descending at a comparatively high velocity.

For the purpose of permitting a regular supply to be introduced without trouble into the entrance neck 2, the tank 1 is connected by a pipe 10 with a similar tank 11 into which the water to be purified is led by a pipe 12 after having passed through baffles 13. The tank 11 is closed at the top by means of a metal plate 14 which allows the froth to escape and flow over into a receptacle 15. The heaviest impurities contained in the water can deposit already in the tank 11 and do not therefore interfere in the operation of decantation.

In order to allow the air to escape from the funnel 3 at the time of filling, this funnel has been prolonged by a jacket 16 surrounding the tank 1 so that the air can escape through the intervening space or passage between the tank 1 and this jacket 16 without choking up the entrance neck 2 for the liquid to be purified. The air bubbles escaping from the liquid and rising up along the walls of the funnel are also discharged by the same passage.

What I claim is:

A decantation apparatus comprising an inverted funnel placed in a casing, a tank arranged above the entrance neck of the funnel and opening into said neck, a jacket surrounding said tank and forming around the tank a passage for the escape of the air, a horizontal pipe connecting the bottom of said tank with the bottom of a second tank into which opens the supply pipe for the liquid to be purified, baffles arranged in said second tank, means for evacuating continuously a current of the heavier portion of the liquid at the bottom of the casing, and means for discharging a current of the clear liquid at the upper end of the casing, said casing being of conical shape so that the lowest velocity reached by the liquid at the bottom end of the funnel is maintained during the ascending movement of the clear liquid between the funnel and the casing.

In testimony whereof I affix my signature in presence of two witnesses.

JOSEPH DENOËL.

Witnesses:
EUGÉNE DRYON,
LEONARD LEVA.